United States Patent [19]

Gauthier et al.

[11] Patent Number: 4,504,300

[45] Date of Patent: Mar. 12, 1985

[54] DEVICE FOR MANUFACTURING AN OBJECT WITH CHIRALIC STRUCTURE FROM A SOURCE OF FORMABLE MATERIAL

[75] Inventors: Francis Gauthier, Gif-sur-Yvette; Jacques Dubos, Palaiseau, both of France

[73] Assignee: Thomson-CSF, Paris, France

[21] Appl. No.: 558,886

[22] Filed: Dec. 7, 1983

[30] Foreign Application Priority Data

Dec. 10, 1982 [FR] France .................. 82 20766

[51] Int. Cl.³ .......................... C03B 37/025
[52] U.S. Cl. .......................... 65/10.1; 65/3.13; 65/12; 65/13; 425/66
[58] Field of Search ............. 65/3.11, 3.13, 10.1, 65/11.1, 12, 13; 425/66

[56] References Cited

U.S. PATENT DOCUMENTS

| 3,328,143 | 6/1967 | Hicks, Jr. ............... | 65/13 X |
| 4,028,081 | 6/1977 | Marcatili ............... | 65/12 X |
| 4,388,093 | 6/1983 | Kimura et al. ........ | 65/12 X |
| 4,396,409 | 8/1983 | Bailey et al. .......... | 65/3.11 |

FOREIGN PATENT DOCUMENTS

| 78733 | 5/1983 | European Pat. Off. . | |
| 3010005 | 2/1981 | Fed. Rep. of Germany . | |
| 1397991 | 3/1965 | France . | |
| 1386200 | 3/1975 | United Kingdom . | |
| 2101762 | 1/1983 | United Kingdom ........ | 65/11.1 |

Primary Examiner—Arthur Kellogg
Attorney, Agent, or Firm—Cushman, Darby & Cushman

[57] ABSTRACT

A device is provided for manufacturing an object having a chiralic structure. It comprises, just after the source of formable material, means for twisting the object during drawing thereof followed by coating means and fast-cooling means which allow a part of the twisting stresses thus obtained to be frozen in the structure.

11 Claims, 3 Drawing Figures

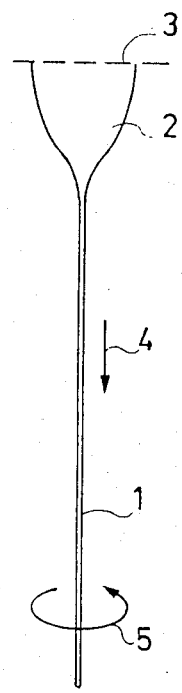
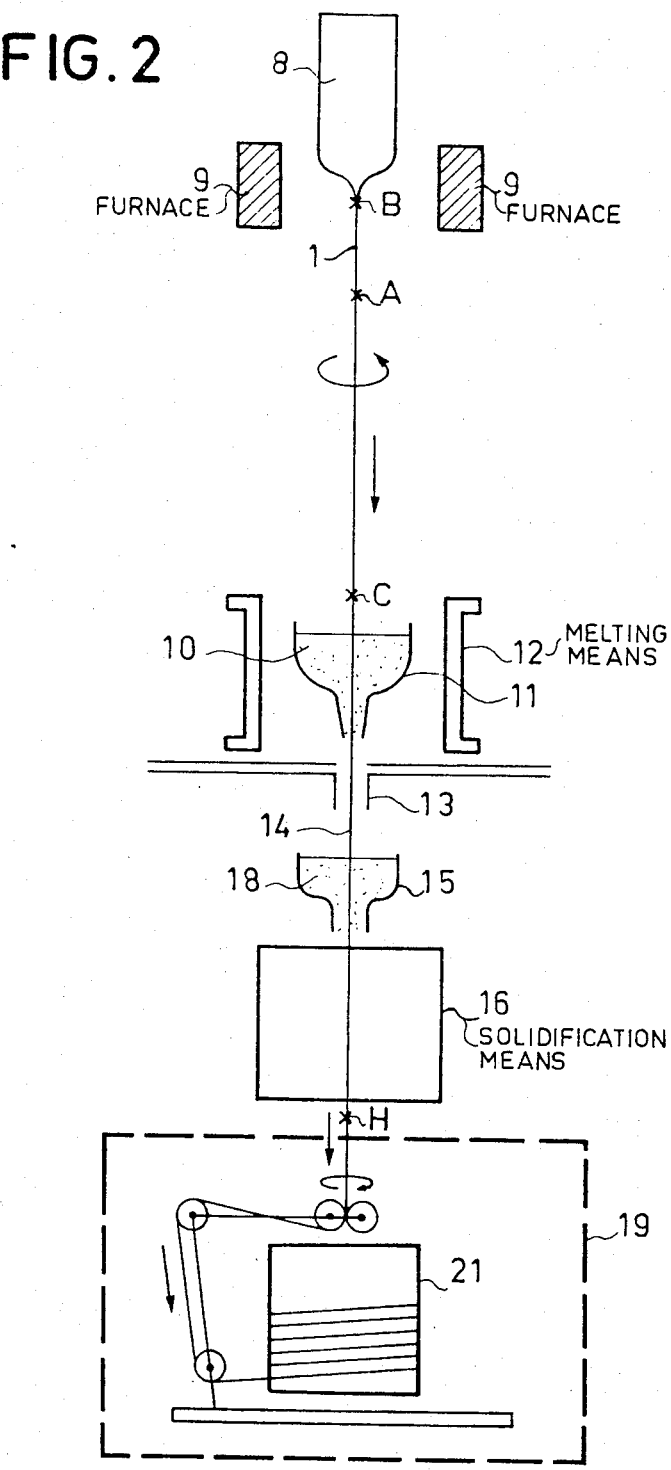

DEVICE FOR MANUFACTURING AN OBJECT WITH CHIRALIC STRUCTURE FROM A SOURCE OF FORMABLE MATERIAL

BACKGROUND OF THE INVENTION

1. Field of the Invention

The present invention relates to a device for manufacturing a drawn object from a source of formable material having a chiralic structure.

2. Description of the Prior Art

Such a drawn object may have any section; it may for example be an optical fiber. This is the case which will be considered by way of non limiting example in the following description.

The monomode fibers usually manufactured for telecommunications always have a little linear birefringence and circular birefringence. Consequently, these fibers keep neither linear polarization nor circular polarization.

It is possible to make the fiber very linear birefringent by breaking up the circular symmetry to the benefit of a planar symmetry.

It is also possible to consider a reverse method, which consists in introducing a high circular birefringence so as to keep the circular polarization.

One solution for creating this circular polarization consists in subjecting the glass fiber to a static twisting stress, for example applied externally by twisting between its two ends: one effect of twisting this fiber is to introduce a circular birefringence therein.

The present invention relates to a manufacturing device for freezing a twisted state induced by a transitorily applied stress. It allows a helical structure or chiralic structure of this fiber to be memorized.

For manufacturing an optical fiber, the most usual glass-making techniques consist in melting the starting materials, fining down and drawing them into fibers by drawing out the molten material. But rather than starting with a molten state, it is very often preferred to start with a preform which prefigures substantially the geometry of the desired fiber which it is then sufficient to draw out.

Thus, in the system of doped silica glass fibers, a means for manufacturing this fiber already proposed consists in rotating the preform at very high speed in the drawing furnace.

This process presents numerous disadvantages: since the preform is not a perfect cylinder, its rotation in the molten viscous state causes the creation of defects in the fiber. By rotating the preform, because of the centrifugal force, the material in the soft state drawn towards the outside undergoes lateral deformation. In fact, the preform which is a bar of glass from 40 to 100 cm long has a high mass. Furthermore, the precessional effect is also important for it. Thus, the defect spectrum obtained for the fiber is not the desired spectrum.

The processes for manufacturing fibers which do not use preforms, for example the process with double crucible in which, for manufacturing an optical fiber, a double crucible is used in which are placed the sheath glass for the external part and the core glass for the inside, and since these raw materials are molten, fined down and drawn, they cannot benefit from this process consisting in rotating the preform because of the difficulties there would be in rotating the double crucible.

To overcome these drawbacks, it is no longer the preform but the fiber which may be rotated. Thus, a fiber is obtained having qualities of conservation of the circular polarization. For that, one manufacturing process consists in causing the fiber to undergo, during drawing into fibers, twisting followed by hardening which freezes in the structure a part of the twisting stresses thus obtained, which destroys the right-left symmetry of the conventional fiber. Thus a chiralic fiber is created.

But in such a device, the winding means rotate, as well as the fiber during its travel through the different coating means, which is a cause of limitation of this twisting speed of the fiber.

SUMMARY OF THE INVENTION

The present invention aims at overcoming the disadvantages and difficulties which have just been recalled while keeping the advantages of this device.

The present invention provides an important simplification of this device.

The invention provides a device for manufacturing an object with chiralic structure comprising a structure of formable material forming a drawing column, means for coating the object with an envelope playing the role of strengthening sheath, followed by Fast-cooling means (Hardening means) for solidifying this envelope about this object, means for pulling this object from this drawing volume and means for twisting this object, wherein the means for twisting said object are disposed between the source and the coating means, which are followed by Fast-cooling means and pulling means.

BRIEF DESCRIPTION OF THE DRAWINGS

The invention will be better understood and other characteristics will appear from the following description, with reference to the accompanying figures, in which:

FIG. 1 illustrates schematically the process of the prior art;

FIG. 2 illustrates a device for implementing the process illustrated in FIG. 1.

DESCRIPTION OF THE PREFERRED EMBODIMENT

Figure 3:
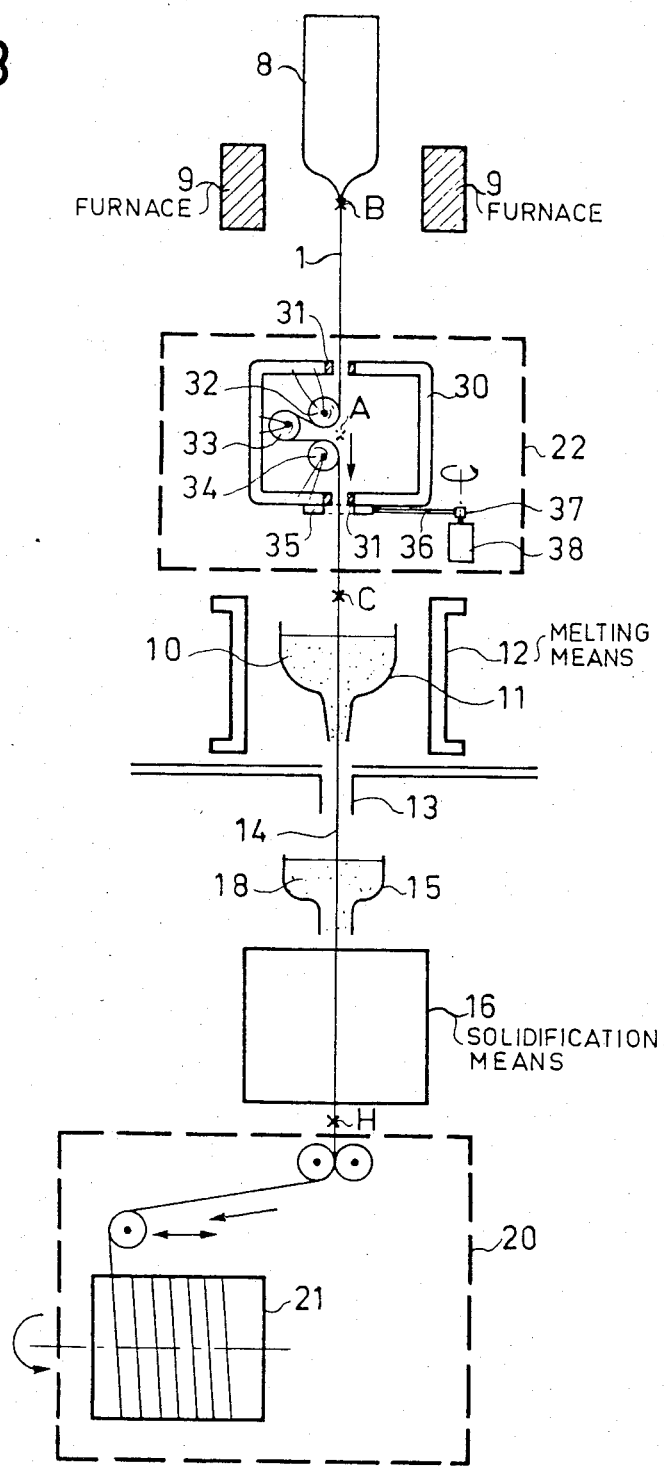
FIG. 3 illustrates the device of the invention.

The drawn object may have any section, and it may be made from different materials: organic or mineral glass, plastic, metal for example.

In the following description, an optical fiber will be discussed but that is in no wise limiting.

The invention will be better understood by taking as basis a process illustrated schematically in FIG. 1.

This process allows the base of the drawing volume to be considered as being fixed, generally it is a question of a viscous cone from which the fiber is formed by any appropriate technique known in the art, this cone and the fiber being twisted during manufacture by axial rotation of the fiber itself. The material source and the forming means have not been shown so as to simplify the figure.

In the rest of the description, the manufacturing process using a preform will be considered, but this is not limiting, any other manufacturing process is also possible.

Referring to FIG. 1, fiber 1 is formed by simultaneous drawing and twisting from the drawing volume 2, base 3 of this volume not being affected by an angular movement.

This base 3 is considered as a reference surface during the whole implementation of the process of the invention, the preform is obviously, as in the devices of the prior art, moved in the direction in which the fiber is drawn so as to be positioned inside means which allow the end of this preform to be softened. These means may be heating means, for example an oven.

If the end of the fiber is twisted, the fiber will be deformed and the twisting torque will be transmitted from the end of the fiber towards the drawing volume. Thus, a given number of turns may be effected over the length of the fiber. If this drawing volume were fixed and rigid, at the end of a certain number of turns, the fiber would break, having reached its elastic resistance limits.

But here, the end of the drawing volume is a viscous cone which, when the twisting torque is applied thereto, creates a resistant torque. There is then a balance which is created between the twisting torque and the viscous resistant torque.

If we continue to twist the fiber at its end, the cone will be deformed and twisted by the number of turns imposed at the end of the fiber.

Simultaneously with this rotational movement of the viscous cone there is a drawing movement of the fiber.

The desired result is that to a certain length of drawn fiber there corresponds a number of twists thereof.

Thus, during the balancing of the procedure, there is an increase in the value of the twisting torque of the fiber and then only the viscous cone situated at the end of this drawing volume will undergo this twisting torque and will be twisted.

When balanced, the fiber length situated between the end of the fiber undergoing the rotation and drawing and the viscous cone is twisted by the chosen known and constant number of turns and the viscous cone twists under the effect of a constant torque.

The fiber is thus twisted and drawn, it is then simultaneously fast-cooled so as to freeze the high temperature state.

A device for twisting a fiber so as to keep the induced circular polarization according to the process illustrated in FIG. 1 is shown schematically in FIG. 2 which is a device of the prior art.

Thus, FIG. 2 illustrates the different elements of a fiber-drawing machine using the process described. These different elements are the following. A preform 8 which is positioned inside the melting means 9, which may be a blow-torch, a Joule effect oven, a high, medium or low frequency induction oven, is at the origin of fiber 1. These melting means 9 soften the preform 8, the material begins to flow and a fiber 1 is obtained by drawing and twisting.

A coating means shown at 11, containing for example glass 10 molten by means 12 for melting this strengthening sheath glass, allows the fiber 1 which is twisted during its manufacture to be coated.

Fast-cooling means 13 allow this state of fiber 1 to be memorized by solidifying the coating material.

At 14 the twisted and coated fiber is obtained; at 15 and 16 are shown means for coating the fiber for protecting same; this may for example be coating with an epoxy resin or metal. At 19 is shown a fiber drawing device for drawing and twisting the fiber during manufacture thereof.

In this FIG. 2, a single fast-cooling means has been shown at 13, but there may also be one at the exit of oven 9, when the fiber has been twisted, for freezing the state of the fiber.

The fast-cooling means considered may for example be a water curtain, a cold radiating panel, a cold gas flow. this may be atmospheric air, if it is a question of glass coating for example.

Moreover, at 16 is to be seen a device which allows solidification of material 18 forming the protection coat applied by coating means 15 to material 10 applied by coating means 11. This may be polymerization if it is for example a question of a plastic envelope, it may more especially be ultra violet ray polymerization. It may aso be fast-cooling.

The device of the invention takes up a certain number of elements of the device shown in FIG. 2, but the fiber drawing device shown at 19 is now formed with a drawing device alone, which allows winding of the fiber on a drum 21 by conventional drum winding and spooling means as shown in FIG. 3.

At point A taken before the means 11 for coating the device of FIG. 2, a device of the invention allows fiber 1 to be twisted during drawing under the effect of drum 21. Let C be a point taken arbitrarily between point B and point H, situated in front of drum 21, for illustrating the implementation of the invention. Between A and C the fiber is twisted elastically. Between C and H the twisted fiber travels linearly through all the devices described in FIG. 2. At B, end of the drawing volume, the fiber rotates on itself during drawing and the twisting torque and the movement are dissipated in a viscous flow, resulting in homogeneizing the material forming the molten material source 8.

Fiber 1 manufactured from a molten material source 8 is simultaneously drawn and twisted by the joint action of a pulling device 20 and a twisting device 22 situated at A. Device 20 is a device without sliding which allows for example the fiber to be wound up without causing it to undergo another troublesome twist.

Device 11 provides coating of the twisted fiber so as to freeze its twist by means of a rigid sheath obtained by rapid cooling or fast-cooling of the sheathing material 10 by means of fast-cooling means 13.

At 15 a material 18 is applied for coating and protecting the sheath, whose freezing is obtained by the action of device 16.

Storage and packaging of the chiralic structure object is provided by device 20.

The originality of the invention resides in the simultaneous use of device 22 situated at A and coating by devices 11 and 15, and packaging provided by device 20.

Device 22 comprises, for example, the following different elements:

A rotating hoop 30 mounted on two hollow bearings 31 rotates about the fiber drawing axis. It supports three pulleys 32,33,34 over which the fiber 1 passes without sliding. The rotation of the hoop causes twisting of the fiber. Hoop 30 is driven by a notched belt 36 disposed between two notched pulleys, one 35 integral with the hoop and the other 37 integral with the shaft of the drive motor 18.

The elastically twisted fiber travels linearly through the sheathing device 11 and its associated fast-cooling device 13. The product applied may be glass, metal, or a high rigidity polymer.

This sheath must then be protected by a coating applied at 15 and treated by the solidification means 16, this may be a silicon, epoxy or fluorocarbonated resin.

The drawing device may be simply a fiber drawing and winding drum whose motor is controlled by a fiber diameter sensor placed at the output of the fiber drawing oven 9.

In the case where no protection coating is applied at 15 to the glass sheath, it is possible to use the still hot glass for causing the fiber to adhere to the take-up drum 10 which could be advantageously made from glass with a low expansion coefficient, even from silica or titanium doped silica.

A multi-pulley capstan may also be used so as to avoid sliding of the fiber under torsion, completed by a take-up drum without conventional spooling tension.

With the device of the invention, a twisted fiber may be produced in-line, coated with a protection and so directly usable or layable and keeping the circular polarization.

The advantages of this device with respect to prior solutions are the following:

only the proposed device 22 is rotating; the preform does not rotate, nor the winding members, nor the fiber during its travel through the different coating means;

it is easy to rotate device 22 at high speed so as to form fibers twisted by 50 to 200 turns per meter at conventional fiber-drawing speeds of the order of 60 m/min.

Fiber-drawing may for example at 60 m/min, i.e. 1 m/s and a torsion at 200 turns/m, i.e. 200 turns/s, which requires a rotation of 1200 turns/min. But this speed is not limitative.

The fibers thus obtained by the process of the invention may be used for forming optical sensors, for example electric current sensors.

What is claimed is:

1. A device for manufacturing an object with chiralic structure comprising a source of formable material forming a drawing volume, means for coating the object with an envelope playing the role of reinforcing sheath, followed by fast-cooling means for solidifying said envelope about said object, means for pulling said object from said drawing volume and means for twisting said object, wherein the means for twisting said object are disposed between the source and said coating means which are followed by fast-cooling means and pulling means.

2. The device as claimed in claim 1, wherein the twisting means comprise a hoop mounted on two hollow bearings rotating about the fiber drawing axis; this hoop supporting three pulleys over which the drawn object passes without sliding, rotation of the hoop causing twisting of the object.

3. The device as claimed in claim 1, wherein the source forming a drawing volume is a preform.

4. The device as claimed in claim 3, wherein the preform is made from glass.

5. The device as claimed in claim 1, wherein the envelope playing the role of reinforcing sheath is made from a material which is glass.

6. The device as claimed in claim 1, wherein the material used for the envelope playing the role of reinforcing sheath is metal.

7. The device as claimed in claim 1, wherein the material used for the envelope playing the role of reinforcing sheath is a high rigidity polymer.

8. The device as claimed in claim 1, further comprising, after the coating means forming the envelope serving as reinforcing sheath and the fast-cooling means, coating means for forming a protection coat followed by means for solidifying this protection coat.

9. The device as claimed in claim 8, wherein the material used for forming the protection coat is an epoxy resin.

10. The device as claimed in claim 8, wherein the material used for forming the protection coat is a fluorocarbonated resin.

11. The device as claimed in claim 8, wherein the material used for forming the protection coat is a silicone resin.

* * * * *